US008195757B2

(12) United States Patent
Fletcher et al.

(10) Patent No.: US 8,195,757 B2
(45) Date of Patent: Jun. 5, 2012

(54) METHOD, APPARATUS AND COMPUTER PROGRAM FOR CONTROLLING RETENTION OF PUBLICATIONS

(75) Inventors: Benjamin Joseph Fletcher, West Yorkshire (GB); Gareth Edward Jones, Hampshire (GB); Andrew James Stanford-Clark, Isle of Wight (GB); Matthew Robert Whitehead, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 11/944,711

(22) Filed: Nov. 26, 2007

(65) Prior Publication Data
US 2008/0133337 A1   Jun. 5, 2008

(30) Foreign Application Priority Data
Nov. 30, 2006   (GB) .................................. 0623917.2

(51) Int. Cl.
*G06F 15/173*   (2006.01)

(52) U.S. Cl. ..................................................... 709/207

(58) Field of Classification Search .................. 705/14.4; 709/217, 270
See application file for complete search history.

(56) References Cited

U.S. PATENT DOCUMENTS

| 7,562,079 | B2 * | 7/2009 | Barker et al. ........................ 1/1 |
| 7,734,723 | B2 * | 6/2010 | Bedi et al. ..................... 709/218 |
| 7,827,234 | B2 * | 11/2010 | Eisenberger et al. ......... 709/203 |
| 2003/0120785 | A1 | 6/2003 | Young |
| 2005/0228798 | A1 | 10/2005 | Shepard et al. |
| 2006/0047666 | A1 | 3/2006 | Bedi et al. |
| 2006/0136256 | A1 | 6/2006 | Roots et al. |

FOREIGN PATENT DOCUMENTS
CN   1668010 A   9/2005

OTHER PUBLICATIONS

M. Cilia, et al. "Looking into the Past: Enhancing Mobile Publish/Subscribe Middleware" Databases and Distributed Systems Group, 2003, ACM Jun. 2003.
Sagnik Bhattacharya, et al. "Energy-Conserving Data Placement and Asynchronous Multicast in Wireless Sensor Networks", Department of Computer Science, University of Virginia, Charlottesville, VA 22904, Nov. 2003.

* cited by examiner

*Primary Examiner* — David Eng
(74) *Attorney, Agent, or Firm* — Winstead, P.C.

(57) ABSTRACT

For managing the retention of publications in a publish/subscribe system, a publisher sends a new publication to a publish/subscribe broker with an indication of whether the new publication should be retained in association with a previous retained publication. The publish/subscribe broker responds to such indications by retaining the new publication with the previous retained publication. The contents or 'payload' of the new published message may be appended to a previous retained message, resulting in a single retained message that contains information from multiple published messages.

17 Claims, 4 Drawing Sheets

METHOD, APPARATUS AND COMPUTER PROGRAM FOR CONTROLLING RETENTION OF PUBLICATIONS

FIELD OF THE INVENTION

The present invention relates to communications and data storage management within a data processing network. In particular, the invention provides apparatus, methods and computer program products for controlling retention of messages in a publish/subscribe messaging environment.

BACKGROUND

Within a messaging network, messages may be delivered from one data processing system to another via one or more "message brokers" that provide routing and, in many cases, transformations and other services. The brokers are typically located at communication hubs within the network, although broker functions may be implemented at various points within a distributed broker network.

Many message brokers support the publish/subscribe communication paradigm. This involves publishers sending communications that can be received by a set of subscribers who have registered their interest in receiving communications of that type, typically without the publishing application needing to know which subscribers are interested. Publish/subscribe allows subscribers to receive the latest information in an area of interest (for example, stock prices or events such as news flashes or special offers) without having to proactively and repeatedly request that information from each of the publishers.

A typical publish/subscribe environment has a number of publisher applications sending messages via a broker to a potentially large number of subscriber applications located on remote devices across the network. The publishers are decoupled from the subscribers, since communication via an intermediate broker does not require a dedicated connection between each publisher and each subscriber, which greatly simplifies the network topology compared with the tightly-coupled conventional client-server paradigm. The subscribers register with a broker and identify the categories of information for which they wish to receive published messages, and this information is stored at the broker. In many publish/subscribe implementations, subscribers specify one or more topic names which represent the information they wish to receive. When publishers send their messages to the broker, the publishers assign topic names to the messages and the broker uses a matching engine to compare the topics of received messages with its stored subscription information for the registered subscribers. This comparison determines which subscribers the message should be forwarded to. Topics are often specified hierarchically, for example using the character string format "root/level1topicName/level2topicName", to enable topics specified within received messages to be compared with subscriptions using a matching algorithm that iteratively steps through the topic hierarchy. Subscriptions can be associated with nodes within a topic tree.

Although subscription matching often involves checking topic fields within message headers, the matching may additionally or alternatively involve checking other message header fields or checking message content, and filtering messages based on the additional information. For example, a message broker implementing the Java198 Message Service (JMS) typically allows filtering based on message properties (but not based on the application data that is the message content or 'payload'). A message broker may perform additional functions, for example performing data content or format transformations or otherwise processing received messages before forwarding them to subscribers. (Java and all Java-based trademarks are trademarks of Sun Microsystems, Inc.).

A commercially available example of a message broker product that supports the publish/subscribe paradigm and allows filtering by message contents is IBM Corporation's WebSphere Message Broker, as described in the documents "IBM WebSphere Message Broker Version 6 Release 0—Introduction", IBM Corporation, July 2006, and "IBM WebSphere Message Broker Version 6 Release 0—Publish/Subscribe", IBM Corporation, July 2006. A message broker may be associated with an underlying message delivery product that handles the complexity of providing assured message delivery over a heterogeneous network. IBM Corporation's WebSphere MQ messaging products are examples of products providing such messaging functions, and are described in a number of publications from IBM Corporation including IBM publication reference No. GC34-6590-01 "WebSphere MQ Clients", June 2005. (IBM and WebSphere are registered trademarks of International Business Machines Corporation).

The publish/subscribe paradigm is an efficient way of disseminating information to multiple users, and is especially useful for environments in which the set of publishers and/or subscribers can change over time and where the number of publishers and/or subscribers can be large. Some subscriptions remain active only while a subscribing application is connected to the broker. These subscriptions are referred to as 'non-durable'. Because 'non-durable' subscribers are likely to miss many desired publications, many other subscriptions are 'durable' and remain active until the subscribing application explicitly unsubscribes. Publications that match the subscription of a disconnected 'durable' subscriber are held at the broker for retrieval when the subscriber reconnects. When a 'durable' subscriber no longer wishes to receive publications, the subscriber can unsubscribe from the broker (or unsubscribe from a particular topic or set of topics).

Although this ability to subscribe and unsubscribe leaves the durable subscriber in control of which publications they receive, there is typically some latency in the performance of each subscriber-initiated subscribe and unsubscribe operation at the broker. In a communications environment that relies on low bandwidth or unreliable connections between a subscriber and a broker, the latency could result in a significant delay before a subscriber can obtain any publications. After a subscribe operation, there may also be a considerable delay before the broker receives any publications that match the new subscriber's subscription. For some subscriber applications, such delays will be acceptable; but some subscriber applications require published information as soon as possible.

Some publish/subscribe brokers delete each publication after the publication has been forwarded to the set of currently-registered subscribers. With such brokers, each subscriber only receives publications that were received by the broker after their respective subscription information is registered by the broker. However, some publish/subscribe brokers implement an optional 'retain' policy whereby the broker retains a copy of the last publication received by the broker for certain topics (typically retaining only one message per topic). Such retained publications may be held in cache memory or other storage at the broker. This can be useful for new subscribers who wish to quickly receive the latest publication on their topics of interest—without having to wait for a new publication to be sent by the respective publisher(s) —and for subscribers to topics for which publications are infrequent.

As an example, consider a currency converter application running on a mobile telephone or PDA. The application requires published foreign currency exchange rates to perform a currency conversion. It could be very misleading to rely on the exchange rates that were published on a different day when the currency converter application was last invoked, and so the application needs to obtain recent exchange rate information from a publish/subscribe broker. However, the user may not want to wait for the exchange rate publisher to send out their next broadcast publication. The application user may be trying to make a quick decision about whether to purchase a commodity, and waiting several minutes or even several seconds for the next publication of exchange rate information may be unacceptable. If the broker retains the most recent exchange rate publication it has received, this can be forwarded to a newly-subscribed currency converter application as soon as they subscribe, without waiting for the publisher's next publication.

In a typical implementation of retained publications, a publisher sets a retain flag and the broker responds to the retain flag by retaining the publication. The publisher may also specify an expiry time for retained publications (after which the published data may be invalid or unhelpful). The broker deletes a retained message when the expiry time is reached.

In other applications, it may be helpful for a new subscriber to receive more than just the last publication. Perhaps cumulative information is more helpful that just seeing a single publication. One solution to this problem is to use a replay server in addition to the publish/subscribe message broker. The replay server retains a large volume of data such that previously published messages are available and can be retrieved if and when required, but the associated processing and storage overheads are correspondingly large. The replay server is a separate entity from the publish/subscribe broker and so it is a non-trivial task to integrate with the subscription matching and content and format transformations of the broker.

Another potential solution is for the broker to retain a predefined number, N, of publications for each topic. However, reliance on a predefined number is inflexible and still leaves the problem of how to decide on a suitable value of N (balancing storage overheads against the benefits of retained publications to new subscribers). A predefined value, N, also does not help with the identification of which set of publications have cumulative significance and should be grouped together and which publications should be handled independently. The potential relationships between publications are disregarded by a typical publish/subscribe broker, and so grouping of publications that have cumulative significance currently relies on analysis by the subscriber applications.

SUMMARY

A first aspect of the present invention provides a method for controlling the retention of publications in a publish/subscribe system. The method comprises a publisher sending a new publication with an indication of whether the new publication should be retained together with a previous retained publication. A publish/subscribe broker responds to such indications by retaining the new publication together with the previous retained publication.

In a preferred embodiment, the contents or 'payload' of the new publication can be appended to a previous retained publication, resulting in a single retained publication containing additional information. This has potential advantages for both brokers and new subscribers. Firstly, the amount of storage needed for a single retained publication with contents built from multiple publications tends to be less than the storage required for multiple retained publications that contain the same data contents, because of the replication of header information. Secondly, once the broker has performed the append operation, the broker's storage management and data access operations are simpler than if the broker were always required to keep track of a set of associated retained publications. Thirdly, a new subscriber can be provided with a single retained publication using conventional techniques and yet, if new contents are appended to the retained publication, the subscriber will obtain the information contents of a set of publications. If the set of publications have cumulative significance, the appended information may result in a single retained publication that is far more helpful to new subscribers than the conventional approach of retaining only the latest publication on each topic.

In a topic-based publish/subscribe system, the indications from a publisher regarding retention of publications may comprise a publisher-specified instruction to the broker to append the contents of the new publication to the latest retained publication for the respective publication topic. Within a publisher system, this new capability may be implemented, for example, as a new API call or optional attribute for use by publisher applications. In this embodiment, the publisher API responds to the new API call or attribute by adding an append instruction to the header information or to the content of a published message.

Meanwhile, the broker preferably implements a retention manager that implements new functions in response to the 'append' instruction or another cumulative retention instruction. In particular, a publish/subscribe broker may respond to an append instruction by adding the new publication (preferably just the contents or 'payload' of the new publication) to the respective retained publication in a storage repository of the broker. The broker is preferably also responsive to a 'non-append' instruction (or to the absence of an 'append' instruction) to flush the previously retained publication. The broker may then retain a new publication that was sent to the broker with the non-append instruction.

According to one embodiment of the invention, new publications that contain an append instruction are each appended to the current retained publication for the respective publication topic, until a new publication is received that does not contain the append instruction. The previously-retained publication is then overwritten by the new 'non-append' publication. Subsequent publications can then be appended as before.

In another embodiment, in response to a publisher indicating the desirability of certain messages being retained together, a set of published messages are accumulated at the broker as distinct but associated messages. This has the advantage that the messages are retained in the same form as originally published, without the broker having to create a modified message with appended contents, and without significant effort by the broker to manage potential discrepancies between a message as initially forwarded (to a first set of subscribers) and the message plus appended contents that is subsequently forwarded to a new subscriber.

The decision regarding whether to append related message contents to a single retained publication or to retain a set of related but distinct messages will depend on the requirements of a particular application.

A second aspect of the invention provides a publish/subscribe broker for use in a publish/subscribe communications network. The broker comprises: means for receiving a publication from a publisher; means for identifying a publisher-specified indication of whether the publication should be retained in association with a previous retained publication; and means, responsive to the publisher-specified indication, for retaining the new publication in association with the previous retained publication.

A third aspect of the invention provides a messaging client for publishing messages to a publish/subscribe broker within a communications network, the publish/subscribe messaging client comprising: means for invoking an operation to send a message to the publish/subscribe broker; and means for specifying within the message that the message should be retained by the broker in association with a previous retained message. The means for invoking and means for specifying are preferably implemented within a messaging API implemented by the messaging client. In one embodiment, the means for specifying that the message should be retained in association with a previously retained publication comprises an optional attribute of an API call that invokes a send operation. The messaging client may include an application program that invokes the send operation and specifies retention requirements, and a message delivery component implementing a message transfer protocol and routing functions to deliver the message across a network to the publish/subscribe broker.

The steps of a method and certain components of a system as described above may be implemented in computer program code and may be made available as a computer program product. Such a program product comprises program code recorded on a recording medium, for controlling the performance of operations on a data processing apparatus on which the program code executes, to implement a method as described above. The computer program may be made available for download via a data transfer medium such as the Internet. Elements of the invention may also be implemented in hardware.

BRIEF DESCRIPTION OF THE DRAWINGS

Embodiments of the present invention are described below in more detail, by way of example, with reference to the accompanying drawings in which.

DETAILED DESCRIPTION

Figure 1:
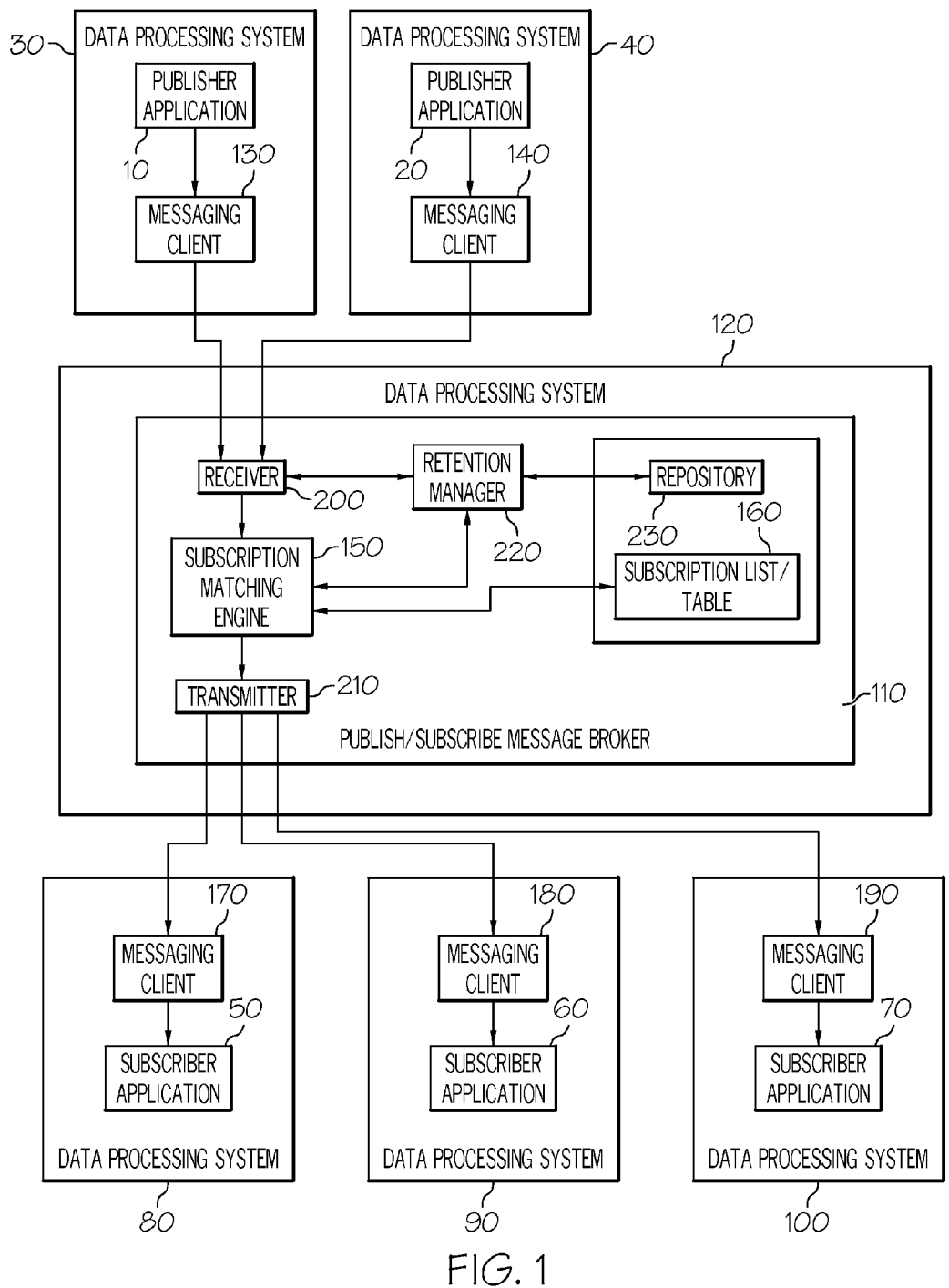
FIG. 1 is a schematic representation of a publish/subscribe data processing network according to an embodiment of the invention.

A number of aspects and embodiments of the invention are described below, including methods, computer programs and data processing apparatus for implementing the invention within a distributed data processing network. The embodiments are described as illustrative examples only, to ensure that the present invention and its advantages may be fully understood. The invention is not limited to the described illustrative embodiments.

The embodiments enable new published messages to be retained together with previous retained publications at a publish/subscribe broker, under the control of indications from the publisher. This enables sets of publications that have cumulative significance to be retained together, as an alternative to retaining all publications or retaining only one publication on each topic, so that a new subscriber can obtain from the broker the latest set of retained publications that have cumulative significance.

For cost reasons and to facilitate ongoing development, it is common for a publish/subscribe matching engine to be implemented in computer program code. In general, several elements of the invention including the described publish/subscribe broker, the publisher applications and the subscriber applications may be implemented in computer program code. This code may be written in an object oriented programming language such as $C^{++}$, Java™ or SmallTalk or in a procedural programming language such as the C programming language. These program code components may execute on a general purpose computer or on a specialized data processing apparatus. As confirmed in more detail below, program code implementing some features and aspects of the invention may execute entirely on a single data processing device or may be distributed across a plurality of data processing systems within a data processing network such as a Local Area Network (LAN), a Wide Area Network (WAN), or the Internet. The connections between different systems and devices within such a network may be wired or wireless and are not limited to any particular communication protocols or data formats and the data processing systems in such a network may be heterogeneous systems.

In many cases a publish/subscribe broker will be implemented on a high capacity, high performance, network-connected data processing system—since such systems can maintain high performance publication throughput for a large number of publishers and subscribers. The publish/subscribe broker may be a component of an edge server (i.e. the broker may be one of a set of Web server or application server components) or a network gateway device. However, 'micro broker' solutions that have a small code footprint have been developed in recent years and have been used for example in remote telemetry applications, so it is now true to say that the publishers, subscribers and publish/subscribe broker may all be implemented on any one of a wide range of data processing systems and devices. The invention can therefore be implemented in networks that include wirelessly-connected PDAs and automated sensor devices as well as networks that include complex and high performance computer systems.

It will be clear to persons skilled in the art that various components of a distributed publish/subscribe communications network could be implemented either in software or in hardware (e.g. using electronic logic circuits). For example, a publish/subscribe matching engine 70 could be implemented by a hardware comparator that compares a topic name within a published message with a topic name within a stored subscription. The comparator's output signal indicating a match or lack of a match would then be processed within an electronic circuit to control whether or not a message is forwarded to a particular subscriber. A filtering step implemented by some publish/subscribe matching engines may be implemented by an electronic filter (a type of electronic circuit)—especially where the data values to which a filter is to be applied can be represented as signal amplitudes.

Thus, it is clear that the present invention is applicable to a wide range of operating environments and may be implemented using various combinations of hardware and software. In each case, the invention provides enhanced event-based management of subscription matching in a publish/subscribe communications environment. In particular, embodiments of the invention enable subscribers to define temporally unpredictable activation and deactivation events, such that subscription matching can be switched on and off by a publish/subscribe broker without requiring the subscribers to repeatedly issue 'subscribe' and 'unsubscribe' requests.

FIG. 1 shows a simple publish/subscribe messaging network in which an embodiment of the present invention has been implemented. A set of publisher applications 10,20 running on respective data processing systems 30,40 are able to publish messages that can be received by multiple subscriber applications 50,60,70 that run on respective data processing systems 80,90,100. The publishers 10,20 send messages to a publish/subscribe message broker 110 that is typically running on another data processing system 120 within the network. The subscribers specify to the broker which message types (for example, message topic names) they wish to receive. The message broker compares received publications with subscription information for the set of subscribers 50,60, 70—for example comparing a topic name within the header of a received message with topic names within a subscription list or table that is associated with the broker, to identify any matches. The publishers and subscribers do not need direct connections between them and do not need each other's address information. Instead, the publishers 10,20 send messages to the broker 110, including message type information such as a message topic; subscribers specify their requirements in subscription information that they send to the broker; and the broker passes received messages on to subscribers that are interested in receiving messages of the received type.

In the example of FIG. 1, the publishers 10,20 and subscribers 50,60,70 rely on message transfer functions of underlying messaging clients 130,140,170,180,190 to handle message routing and formatting operations that take account of the complexities of a typical heterogeneous distributed network, as well as to provide an asynchronous message processing capability using message queues. In other embodiments, the message transfer functions of the messaging clients may instead be implemented as integral features of the publisher applications.

The message broker 110 comprises a subscription matching engine 150 and an associated subscription list or table 160 within a repository of the broker's data processing system 120. In some embodiments, the message broker interfaces with a local messaging system (for example an IBM WebSphere MQ messaging product) that interoperates with the remote messaging clients 130,140,170,180,190 via network communications, but in the present embodiment the message routing and formatting features of the broker's data processing system 120 are implemented as integral features of the broker 110 itself. In particular, receiver and transmitter components 200,210 of the broker 110 include, for each messaging client, a communications stack and a protocol handling module for marshalling and demarshalling of the message broker's internal representations of a message to and from a canonical byte format, to allow messages to flow over the network connections. The communications stack has access to a TCP/IP socket for communication with the external network. The message broker 110 listens on a particular TCP port for newly established client connections. On receipt of an inbound connection request, the message broker bootstraps a communications stack for that client. This stack is responsible for maintaining the connection with the client and monitoring the current state of the socket connection. The communications stack bootstraps the protocol handling module, and the protocol handling module handles the decoding and encoding of the message formats and communication protocol in order to achieve an internal object representation that can be consumed by the message broker. For example, the protocol module will demarshal inbound messages from a publisher client into an object form and submit them to the publish/subscribe matching engine for matching with registered subscriptions and for delivery to subscribers.

The matching engine compares a received publication with the set of currently registered subscriptions to identify zero, one or more matches. In the present embodiment, this involves topic matching as is known in the art and as described above. If the subscriber applications 50,60,70 are currently registered with the broker and are identified as SUBSCRIBER1, SUBSCRIBER2 and SUBSCRIBER3 respectively, a simple subscription list held at the broker may be as follows:

SUBSCRIBER1: TOPIC1, TOPIC3
SUBSCRIBER2: TOPIC2, TOPIC4
SUBSCRIBER3: TOPIC1

Typically, each topic is represented in an hierarchical character string format corresponding to an hierarchical topic tree used by the subscription matching engine 150. For example, TOPIC1 may be of the format "root/level1topicName/level2topicName", so that the matching engine can step through the hierarchy to check for matching subscriptions, as described earlier. Subject to any message filtering that is additional to topic matching, all messages on TOPIC1 that are received by the broker will be forwarded to SUBSCRIBER1 and SUBSCRIBER3. Messages received on TOPIC2 will be forwarded to SUBSCRIBER2 only; messages on TOPIC3 will be forwarded to SUBSCRIBER1 only; and messages on TOPIC4 will be forwarded to SUBSCRIBER2 only.

For the particular embodiment of FIG. 1, let us assume that all of the subscribers have non-durable subscriptions and so no messages are held at the broker on a per-subscriber basis for currently disconnected subscribers. Let us assume also that there is no high-capacity replay server. In other words, each publication is forwarded to the current set of registered subscribers that have subscribed to receive publications on the particular message topic specified within the published message, but in this particular embodiment there is no saving of messages on behalf of durable subscribers that are currently disconnected.

However, although publications are not saved on a persubscriber basis, the present invention does provide support for retained publications, as described below.

An example messaging API that is used by known publisher applications includes a sendMessage operation that sends a message to the broker in response to a publisher specifying a topic name, specifying or attaching message data, and optionally setting a "retain" flag. The topic name is one of a set of predefined topic names, where each topic name in the set is interpretable by the message broker 110 and may be specified as a topic of interest by one or more subscribers. When specified by the publisher, the topic name and retain flag are included in a header of the sent message. The message data is also included in the message. The setting of the "retain" flag by the publisher is an instruction to the broker to copy this message into a message repository at the broker, and to retain the copy in the repository while this message is the latest-received message on the particular topic. The format of the sendMessage API call may be:

sendMessage(TOPIC_NAME, DATA, RETAIN_FLAG)

where TOPIC_NAME may be an hierarchical character string identifying one of the predefined topics, DATA is the data contents of the message, and RETAIN_FLAG is a value representing logical 'true' (i.e. the message should be retained at the broker) or 'false' (the message should not be retained). For example, a message may be published by issuing an API call such as:

sendMessage("greenhouse/temperature", "34 degrees", true)

where the topic is "greenhouse/temperature", the message data is a small data item "34 degrees", and the retain flag value is set to "true".

The broker will retain a copy of the message data "34 degrees" under topic "greenhouse/temperature" until a message is received on that topic that has a different data value (for example "32 degrees"). The new data value will then overwrite the previous value. This implementation of retained messages (as described so far within the last few paragraphs above) is known in the art.

In the present invention, however, a message that has the retain flag set to "true" does not necessarily overwrite an existing retained message but may instead be appended to (or otherwise combined with) previously retained messages on the same topic.

In the present embodiment, the retain feature is implemented by a retention manager 220 that is a component of the message broker 110. The retention manager receives a copy of the message data of each message received on any topic if the retain flag has been set to "true". Messages that do not have this flag set to "true" are not passed to the retention manager. Of course, the retain flag may be implemented using values 1 and 0 to represent "true" and "false", or using any other expression that has the effect of indicating whether the publisher requires messages to be retained or not.

Figure 2:
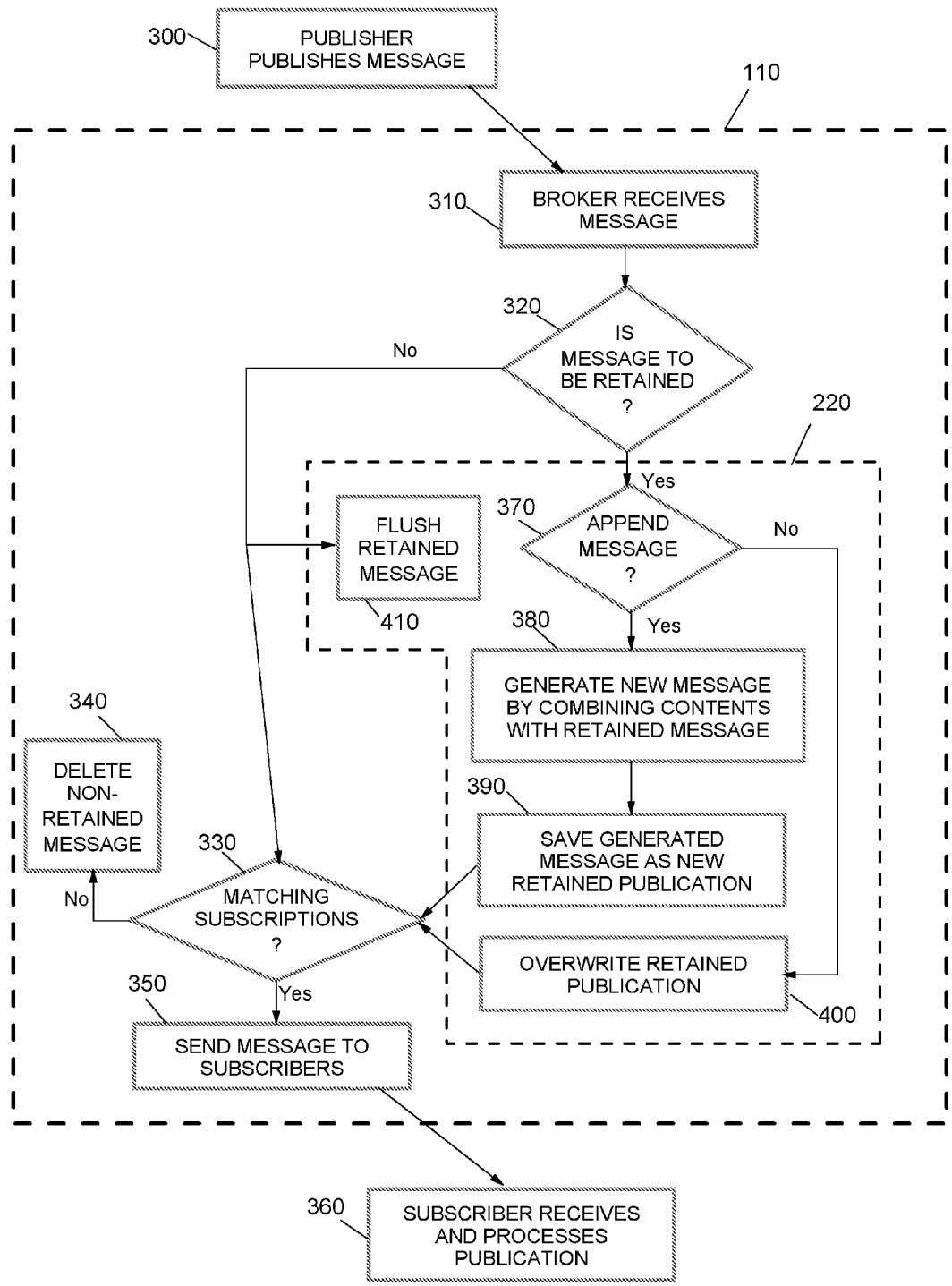
FIG. 2 is a flowchart representation of the steps of a method according to one embodiment of the invention.

FIG. 2 provides an illustration of a sequence of processing within the message broker 110 according to a first example embodiment of the invention. This processing sequence is only one possible implementation of the invention, and additional examples are described below with reference to FIG. 3 etc. A publisher 10 sends 300 a message to the broker 110, including a retain flag and an additional append flag which can take a value of true or false. The operations performed at a publisher system are described in more detail below with reference to FIG. 4. The append flag is also described in more detail below. The published message is processed 310 by the receiver-side communication stack and protocol handler 200, and then the retain flag is checked 320 to determine whether the publisher intended the message to be retained at the broker. If the retain flag is set to false, the message is passed to the subscription matching engine 150. The subscription matching engine 150 compares 330 the topic information within the message header with the subscriptions 160 that were previously stored by the broker 110 to identify any matching subscriptions. If there is no topic match (or if other filter conditions are not satisfied), the message is deleted 340. A positive match between one or more subscriptions and the published message results in the message being forwarded 350 to one or more identified subscriber(s), using conventional techniques. The subscriber(s) then receive 360 and process the message in whatever way is specified by their own application logic.

However, if the retain flag is determined 320 to be set to true, the message is passed to the retention manager 220. The retention manager extracts a value from an additional field of the message header to determine 370 whether the message should be appended to existing retained messages on the specified topic or should overwrite any previously retained messages. The additional message header field is specified within a sendMessage API call as follows:

sendMessage(TOPIC_NAME, DATA, RETAIN_FLAG, APPEND_FLAG)

where the logical value of the APPEND_FLAG can be "true" or "false". If the append value is "true" the message data is appended 380 to any previously retained message on this topic and saved 390 in a repository 230 of retained publications. Appending the message data involves copying the message data from the previous retained publication and extracting the message data from newly received publication on the same topic, and generating a new message in which the extracted new data is appended to the previously retained data. In a first embodiment, the message header information held in the repository 230 is unchanged from the previous retained publication (i.e. only the message contents are expanded by the append operation). In some cases, subscriber applications do not need to process the information that is held in message headers, and since much of the header information is identical between successive publications on the same topic, there is no need to change the message header information in the repository 230 when appending a message. In a second embodiment, where publication dates and times are of interest to subscriber applications, the message header of a previous retained publication may either be retained unchanged or may be replaced by the message header of a newly received publication that has been appended to the retained publication, depending on the requirements of subscriber applications. In yet another embodiment, where permitted by the message header fields, message headers of appended messages may be merged (for example to include dates and times of the first and last publications for a set of appended log records).

A first example sendMessage API call conforming to the above-described new format is as follows:

sendMessage("application/log", "09-Mar-2006 11:23: 42 com.ibm.myapplication.MyClassException: java.lang.NullPointerException", true, true)

If multiple messages are received at the broker on this topic and they each have the append flag set to "true", the message data held at the broker for the specified topic can be built up over time in the repository 230, such as in the following example:

"09-Mar-2006 11:25:12
com.ibm.myapplication.MyClassException:java-
  .lang.NullPointerException
09-Mar-2006 11:24:30
com.ibm.myapplication.MyClassException:java-
  .lang.NullPointerException
09-Mar-2006 11:23:42
com.ibm.myapplication.MyClassException:java-
  .lang.NullPointerException"

In this first embodiment, the set of appended messages can be flushed and overwritten 400 by a new retained publication when required. The decision to flush may be a consequence of checking a timer expiry as part of the determination 370 of whether to append, or the determination 370 may be responsive to a sendMessage( ) API call in which the append flag has been set to "false", for example. For a publisher application, decisions can be made regarding when to append to a retained publication, and when to flush and overwrite a retained publication, according to the progress of execution within the application. For example, a new log may be started when an application restarts or when a new execution thread starts, and that restart can be an appropriate point in time to flush the previous retained message and to start retaining new log records. Other repeated stages of execution of a publisher application may be suitable points at which to flush retained messages.

This flexible control over retaining and flushing of retained messages is an improvement over merely retaining the last N messages, since the latter would leave subscribers with the task of differentiating between unrelated retained publications such as log records for different application executions.

In one embodiment, a decision not to retain a published message is interpreted by the retention manager 220 as an instruction to flush 410 the existing retained publication from the repository 230 as shown in FIG. 2 (since to do otherwise could leave an out-of-date retained message in the repository). In another embodiment, any message with the retain flag set to false is completely disregarded by the retention manager.

In one embodiment of the invention, the message that is processed by the subscription matching engine and eventually forwarded to registered subscribers is the latest retained publication—i.e. either the latest received publication that has overwritten 400 a previous retained publication, or the latest result of appending 380 a received message to a previously retained message. Whether it is more helpful to the current set of subscribers to forward a single message to them that contains cumulative data (i.e. appended messages) or to forward the latest received publication (i.e. without appending) will depend on the particular application environment. A message with appended contents may be the most helpful item to forward in the case of log records that relate to a current execution thread within a publisher application, because the receiving subscriber can then process the relevant set of log records by processing a single message without having to aggregate information from multiple published messages.

However, in other embodiments, appended messages are only used for 'late' subscribers and intermittent subscribers—to provide a fast update mechanism in response to a new subscription. Therefore, the subscribers that are connected to the broker when a new publication is received will receive that new publication if it matches their subscriptions (i.e. without any change from conventional publish/subscribe solutions that do not have a retention manager appending or otherwise associating messages, and without the dashed arrows between the retention manager and the subscription matching engine 150). This implementation would result in late subscribers receiving published information in a different format (appended in a single message) from current subscribers but, since the data contents will be the same, the issue of different formats will not cause problems for many subscriber applications.

If the cumulative set of data that is built up in the repository 230 by the retention manager 220 is more helpful to new subscriber applications than a single retained message would be, the 'append' feature of the present invention achieves an improvement over known retained publication solutions. This will be true for many different types of subscriber applications, such as many monitoring applications that need to see an event frequency or a pattern within received data values rather than just a single data value. Referring back to the exchange rate example, it may be very relevant to a user whether the relative value of a currency is increasing or decreasing. In another example in which a subscriber application is monitoring processing exceptions, a single exception may not necessitate any action by the subscriber application but a high frequency of exceptions may indicate a problem that needs urgent attention.

The event frequency or pattern within published message data would become available to a new subscriber over time even without the append feature of the present invention, if the new subscriber is able to connect for a long enough period to receive a large enough sequence of newly published messages. However, some subscribers will only be able to connect briefly, and some users of subscriber applications will wish to receive fast results as soon as they subscribe. Therefore there are many classes of application for which the present invention provides an improvement over known solutions.

Embodiments of the invention enable new options for 'quality of service' to be provided to subscribers. For example, a subscriber may not require a durable subscription if a retention manager is accumulating data from the latest set of related messages (such as all logs for a current application execution thread). A non-durable subscription and the subset of messages retained by the retention manager may suffice, whereas a single latest publication or the last N published messages may not. A subscriber that only connects to the broker infrequently and briefly may obtain sufficient information from the repository 230 that is used by the retention manager 220, and so may be able to avoid lots of out-of-date messages being stored at the broker.

In another embodiment of the invention, the instruction to append a message to previous retained messages may be specified by using a new API call for sending messages such as:

appendMessage(TOPIC_NAME, DATA)

There is no need for a retain flag since any message sent using appendMessage( ) is intended to be retained. Messages that are intended to flush and overwrite the set of retained messages for the particular topic can continue use of the known API call format:

sendMessage(TOPIC_NAME, DATA, RETAIN_
    FLAG)

or another new API call may be provided, such as:

replaceMessage(TOPIC_NAME, DATA)

The appendMessage( ) call described above invokes an operation within the publisher application's API to send a message in the same way as the previously described example sendMessage(TOPIC_NAME, DATA, RETAIN_FLAG, APPEND_FLAG).

A first example appendMessage( ) call is as follows:

appendMessage("application/log", "09-Mar-2006
    11:23:42 com.ibm.myapplication.MyClassEx-
    ception:java.lang.NullPointerException")

Regardless of which of the above interface implementations is implemented, or any alternative implementation, it is generally desirable for the message broker to be configurable to set a maximum message length for a retained appended set of messages. Attributes such as a maximum message length or timeout period could also be specified within the API call. There are various implementation options for how the retention manager responds to appended message contents reaching the maximum size. In one embodiment, the retention manager creates a second retained message associated with the first retained message, and continues appending data to the second retained message until that reaches a maximum size or the retained messages are flushed. In another embodiment, the oversize retained message is flushed or truncated so that more recently published information can be appended.

In another embodiment, an appendMessage( ) API call (or one of the other interface options described above) may be responded to by accumulating a set of retained messages in the repository 230 in association with each other. This is an alternative to retaining a single publication with appended message contents. The retention manager 220 responds to a late subscriber by identifying the set of associated messages retained in the repository 230 that are relevant to the new subscription, and forwards this set of publications to the new subscriber. This approach of retaining publications as separate but associated messages ensures that the retained publications that will be sent to 'late' subscribers are each identical to the publication as sent to other subscribers.

Figure 3:
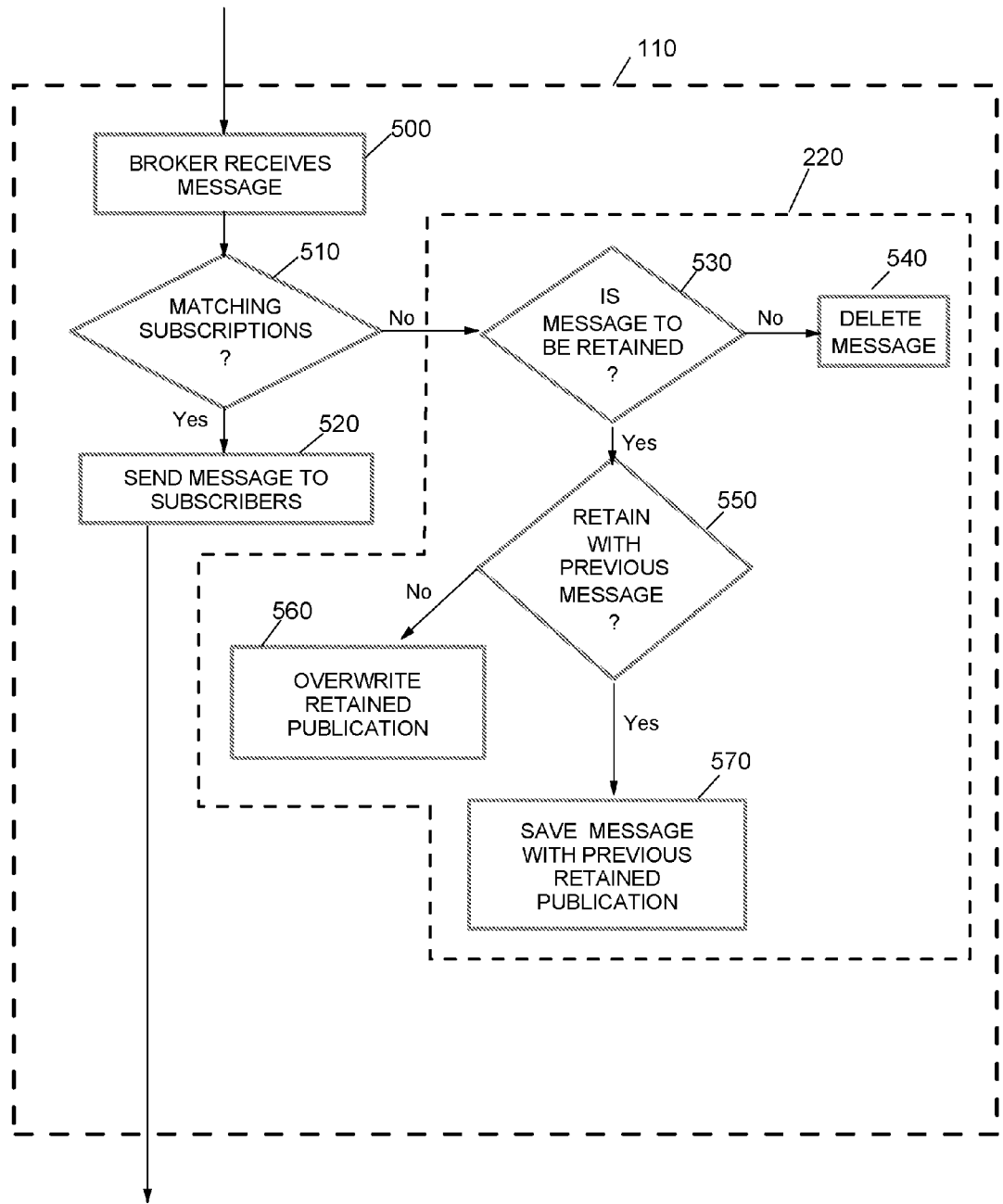
FIG. 3 is a flowchart representation of the steps of a method according to a further embodiment of the invention.

While FIG. 2 provides a flow diagram representation of a method of processing a published message in which messages may be appended to other messages before being forwarded on to subscribers, FIG. 3 shows an alternative implementation in which the processing by the retention manager is performed subsequent to the matching engine 150 processing the message. In this embodiment, a received publication can be forwarded to currently registered subscribers without waiting for the retention manager to complete its processing.

Referring to FIG. 3, the processing of a received message to identify currently interested subscribers is merely conventional, but the retention manager takes account of indications from the publishers regarding whether a newly published message should be retained in association with earlier publications that are held as retained messages. The broker receives 500 a new publication and passes the publication to a subscription matching engine. The subscription matching engine compares 510 topic information and possibly other header information of message contents with a set of stored subscriptions, as is known in the art. If at least one matching subscription is identified, the publication is forwarded 520 to the respective subscriber(s). The publication is also passed to a retention manager 220, which in this embodiment performs 530 the check of whether the publication is to be retained or not. As in the above-described embodiments, this check can involve checking a retain flag within the published message header, and possible checking a timer or topic names or other criteria according to a set of rules applied by the retention manager. If the message is not to be retained, the message can now be deleted 540 from the broker.

If the check of the retain flag and other criteria determines that the published message should be retained at the broker, a determination is then performed 550 of whether the new publication should be retained together with one or more previous retained publications, or whether the new publication should be the only retained publication on that topic. As described above, the determination 550 may involve checking an append flag within a field of the published message header, or responding to an appendMessage( ) API call. If it is determined that the new publication should be retained but should not be combined with previous publications, the new publication is saved as the new retained publication for the particular message topic—overwriting 560 the previous retained publication on the same topic. If a determination is made that the published message should be combined with one or more previous publications, the repository 230 is updated by saving 570 the new publication in association with the previous retained publication(s). In the updated repository 230, an original retained publication has a pointer added to it, which pointer identifies a storage location of the next retained publication on the same topic. New publications and pointers can be added as required. This set of associated publications is held in the repository 230 until required by a 'late' subscriber or until a timeout or flush instruction.

In another embodiment of the invention, the retention manager may receive messages after they have passed through the receiver-side communication stack and protocol handler 200 in parallel with processing by the matching engine.

In another embodiment, the retention manager could be implemented to retain the latest message received on any and every topic or for a predefined subset of topics, without reliance on a "retain" flag. The retention manager could be implemented to retain messages on only a predefined subset of topics and only if the "retain" flag has been set to true.

Figure 4:
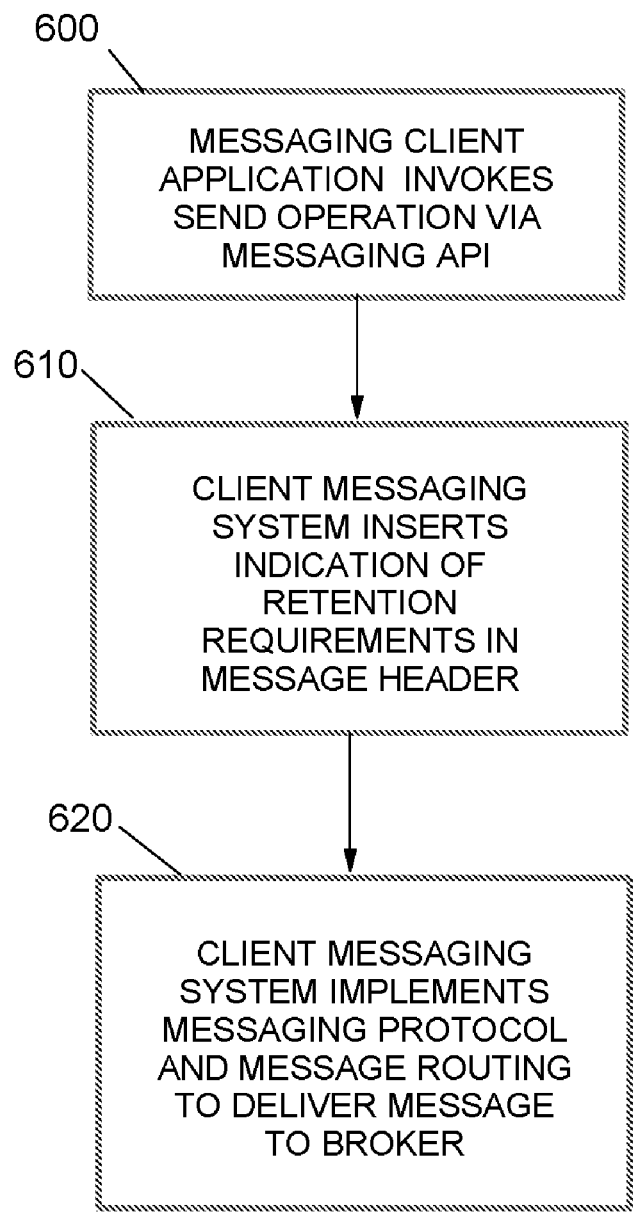
FIG. 4 shows operations performed at a publisher messaging client system.

A typical messaging client system for publishing messages to a publish/subscribe broker comprises a publisher application implementing a message API, and a message delivery component for transferring messages to the publish/subscribe broker's data processing system. As shown in FIG. 4, a messaging client application invokes 600 a send message operation using the messaging API as described above, including specifying parameters such as retention requirements. The messaging API inserts 610 message retention indications in header fields of the message. A message delivery component of the messaging client system implements a message delivery protocol and routing functions to deliver 620 the message to the broker.

It will be clear to persons skilled in the art that various modifications and additions may be made to the above-described embodiments within the scope of the invention, and that the claims set out below should not be interpreted as limited to the particular illustrative embodiments described in detail above.

What is claimed is:

1. A method for controlling the retention of publications in a publish/subscribe system, the method comprising:
   a publish/subscribe broker receiving a new publication from a publisher;
   the publish/subscribe broker identifying a publisher-specified indication of whether the new publication should be retained in association with a previously retained publication; and
   the publish/subscribe broker running on a data processing system, wherein a processor of the data processing system responds to the publisher-specified indication by retaining the new publication in association with the previously retained publication.

2. A method according to claim 1, wherein the publisher-specified indication comprises an append instruction and the step of retaining the new publication in association with the previously retained publication comprises appending data within the received new publication to the data within the previously retained publication.

3. A method according to claim 2, including the step of checking whether the step of appending data would exceed a maximum message size, and rejecting the append instruction if the step of appending data would exceed the maximum message size.

4. A method according to claim 3, wherein the publish/subscribe broker is responsive to said rejecting to retain the new publication in association with a previously retained publication.

5. A method according to claim 1, wherein the step of retaining the new publication in association with the previously retained publication comprises retaining a plurality of separate publications together with information describing the association between the separate publications.

6. A method according to claim 1, wherein the publish/subscribe broker is responsive to the absence of said publisher-specified indication, for a publication that nevertheless requires retention, to overwrite the previously retained publication.

7. A method according to claim 6, wherein the received new publication comprises a message having a message header and a message body, wherein the message header comprises a first field indicating whether the publisher requires retention of the message body and a second field comprising the publisher-specified indication of whether the message body should be retained in association with the previously retained publication.

8. A method according to claim 1, for use in a topic-based publish/subscriber system in which subscribers specify topics of interest within subscriptions, and in which a matching engine of the publish/subscribe broker compares a topic that is specified within a received publication with subscriber-specified topics within subscriptions held at the publish/subscribe broker,
wherein the broker is responsive to receipt of a new subscription including a subscriber-specified topic to transfer to the respective subscriber any publication that is currently retained by the broker for the subscriber-specified topic.

9. A publish/subscribe broker for use in a publish/subscribe communications network, the broker comprising:
means for receiving a publication from a publisher;
a subscription matching component for comparing received publications with stored subscriptions to identify matching publications, thereby to identify subscribers to which the matching publications should be forwarded;
means for forwarding matching publications to identified subscribers; and
a retention manager, wherein the retention manager is responsive to a publisher-specified indication of whether the publication should be retained in association with a previous retained publication, to retain the new publication in association with the previous retained publication.

10. A computer program product embodied in a computer readable memory for controlling the retention of publications in a publish/subscribe system, the computer program product comprising the programming instructions for:
receiving a new publication from a publisher;
identifying a publisher-specified indication of whether the new publication should be retained in association with a previously retained publication; and
responding to the publisher-specified indication by retaining the new publication in association with the previously retained publication.

11. The computer program product as recited in claim 10, wherein the publisher-specified indication comprises an append instruction and the programming instructions for retaining the new publication in association with the previously retained publication comprises the programming instructions for appending data within the received new publication to the data within the previously retained publication.

12. The computer program product as recited in claim 10, wherein the programming instructions for retaining the new publication in association with the previously retained publication comprises the programming instructions for retaining a plurality of separate publications together with information describing the association between the separate publications.

13. The computer program product as recited in claim 10, wherein the publish/subscribe broker is responsive to the absence of said publisher-specified indication, for a publication that nevertheless requires retention, to overwrite the previously retained publication.

14. The computer program product as recited in claim 13, wherein the received new publication comprises a message having a message header and a message body, wherein the message header comprises a first field indicating whether the publisher requires retention of the message body and a second field comprising the publisher-specified indication of whether the message body should be retained in association with the previously retained publication.

15. The computer program product as recited in claim 10, for use in a topic-based publish/subscriber system in which subscribers specify topics of interest within subscriptions, and in which a matching engine of the publish/subscribe broker compares a topic that is specified within a received publication with subscriber-specified topics within subscriptions held at the publish/subscribe broker, wherein the broker is responsive to receipt of a new subscription including a subscriber-specified topic to transfer to the respective subscriber any publication that is currently retained by the broker for the subscriber-specified topic.

16. The computer program product as recited in claim 11 further comprising the programming instructions for:
checking whether said appending data would exceed a maximum message size, and rejecting the append instruction if said appending data would exceed the maximum message size.

17. The computer program product as recited in claim 16, wherein the publish/subscribe broker is responsive to said rejecting to retain the new publication in association with a previously retained publication.

* * * * *